(12) United States Patent
Badin et al.

(10) Patent No.: US 7,350,651 B2
(45) Date of Patent: Apr. 1, 2008

(54) HOLLOW GLASS PRODUCT WITH OFFSET COLLAR AXIS AND PROCESS OF MANUFACTURING THE SAME

(75) Inventors: Remy Badin, Criel (FR); Lucien Fosse, Etalondes (FR)

(73) Assignee: Saint-Gobain Emballage, Courbevoie (FR)

( * ) Notice: Subject to any disclaimer, the term of this patent is extended or adjusted under 35 U.S.C. 154(b) by 429 days.

(21) Appl. No.: 09/534,973

(22) Filed: Mar. 27, 2000

(65) Prior Publication Data

US 2002/0070190 A1    Jun. 13, 2002

(30) Foreign Application Priority Data

Mar. 25, 1999   (FR)   .................................. 99 03718

(51) Int. Cl.
*B65D 1/02*   (2006.01)

(52) U.S. Cl. ...................................................... 215/40

(58) Field of Classification Search .................. 215/40, 215/11.1; 206/219; 422/74; 73/427; 222/158
See application file for complete search history.

(56) References Cited

U.S. PATENT DOCUMENTS

| | | | | |
|---|---|---|---|---|
| 246,879 | A | * | 9/1881 | Hall ........................... 215/40 X |
| 628,269 | A | * | 7/1899 | Lloyd ......................... 215/40 X |
| 675,972 | A | * | 6/1901 | Raymond, 2nd. ............ 206/219 |
| 714,968 | A | * | 12/1902 | Swanson ..................... 206/219 |
| 809,952 | A | * | 1/1906 | Hoffa .......................... 206/217 |
| 820,576 | A | * | 5/1906 | Hutchins ..................... 206/219 |
| 964,044 | A | * | 7/1910 | McCarron .................. 215/40 X |
| 1,093,740 | A | * | 4/1914 | Stevenson ................... 222/158 |
| 1,528,924 | A | * | 3/1925 | Juebner ..................... 215/40 X |
| 1,710,951 | A | * | 4/1929 | Shaweker .................... 222/462 |
| 1,971,164 | A | * | 8/1934 | Paley .......................... 422/74 |
| 2,514,744 | A | * | 7/1950 | Cipyak ...................... 215/40 X |
| D192,978 | S | * | 6/1962 | Garvey ..................... 215/40 X |
| 3,094,234 | A | * | 6/1963 | Warburg et al. ............ 206/219 |
| 3,145,867 | A | * | 8/1964 | Roberts et al. ............ 215/40 X |
| 3,608,017 | A | * | 9/1971 | Cines ........................ 315/40 X |
| 4,079,859 | A | * | 3/1978 | Jennings ........................ 222/1 |
| 4,292,846 | A | * | 10/1981 | Barnett ........................ 73/427 |
| 4,298,038 | A | * | 11/1981 | Jennings ........................ 141/2 |
| 4,646,948 | A | * | 3/1987 | Jennings ..................... 222/454 |
| 4,851,351 | A | * | 7/1989 | Akamine .................. 215/40 X |
| 5,447,245 | A | * | 9/1995 | Merhar .......................... 215/6 |
| 5,597,087 | A | * | 1/1997 | Vinarsky .................. 215/40 X |
| 5,924,583 | A | * | 7/1999 | Stevens et al. ............... 215/40 |

FOREIGN PATENT DOCUMENTS

| | | |
|---|---|---|
| DE | 567 621 C | 12/1932 |
| GB | 139 322 A | 3/1920 |

* cited by examiner

*Primary Examiner*—Stephen K. Cronin
(74) *Attorney, Agent, or Firm*—Oblon, Spivak, McClelland, Maier & Neustadt, P.C.

(57) ABSTRACT

A process of manufacturing a hollow glass product with an offset collar axis, including the steps of inserting molten material into a cavity of a roughing mold, allowing the molten material to penetrate into a bottom portion of the roughing mold, perforating a collar by moving a punch into the bottom portion of the roughing mold along a non-vertical axis, extracting the punch from the bottom portion of the roughing mold, thereby completing processes of shaping the molten material into a blank, transferring the blank into a finishing mold by turning over the blank 180° with respect to a horizontal axis, and blowing the blank through the collar in the finishing mold such that the blank shapes into a hollow glass product. The cavity includes at least one input section which is substantially vertical.

23 Claims, 7 Drawing Sheets

HOLLOW GLASS PRODUCT WITH OFFSET COLLAR AXIS AND PROCESS OF MANUFACTURING THE SAME

CROSS-REFERENCE TO RELATED APPLICATION

The present application claims priority under 35 U.S.C. §119 to French Patent Application No. 99/03718, filed Mar. 25, 1999, entitled "Hollow Glass Product With Offset Collar Axis." The contents of that application are incorporated herein by reference in their entirety.

BACKGROUND OF THE INVENTION

1. Field of the Invention

The present invention pertains to a hollow glass product and a process of manufacturing the same.

2. Description of the Background

The traditional processes that are extensively used at the present time to fabricate the aforementioned products utilize so-called I.S. (Individual Section) machines and are known under the names of "blown-blown" and "press-blown" processes. During the first stage of these traditional processes, a ball or drop of glass is introduced into a roughing mold and shaped into a form of a rough mold. The base of the roughing mold is extended by a collar mold used for shaping an upper opening part of a product to be fabricated in the rough mold.

The collar mold also has the function of gripping the rough mold in a subsequent operation of turning over the rough mold prior to the second stage in which the roughing mold is replaced by a finishing mold. In the finishing mold, the rough mold is shaped into a final hollow product by blowing.

Among the processes currently being used, the "blown-blown" process can be broken down into the following stages:

loading: a drop or ball of glass enters due to the effect of its own weight into a first mold (a roughing mold) through its upper end which corresponds to the bottom of a final product such as a bottle, etc.;

compression: after loading, a rough bottom section closes the roughing mold; then a blast of compressed air forces the drop of glass in the roughing mold through the intermediary of the roughing mold into the lower part of the mold in which a collar of the final product is later formed; this compression also ensures good thermal contact between the drop of glass and the roughing mold;

perforation: a punch of small dimensions, taking up approximately the height of the collar and fitted at the lower part of the roughing mold, detaches from the lower part of the roughing mold, thereby leaving room for compressed air to be delivered, the compressed air pushes in front of it the hot, less viscous glass located in the vicinity of the axis of the roughing mold, while the more viscous cold glass that has been cooled upon contact with the mold remains in place; a blank or a rough mold of the final product is thereby produced;

transfer: when the blank is sufficiently cooled in the roughing mold for handling, the blank is transferred into a second mold (a finishing mold) which has a shape of the final product;

elongation and blowing: once the blank is placed in the finishing mold, the blank is allowed to lengthen for a certain amount of time before blowing in order to give the shape of the product; this lengthening stage allows the glass to be distributed throughout the product;

extraction: upon contact with the finishing mold, the glass cools quickly, and when its viscosity is sufficiently low, the product is extracted from the finishing mold.

The "press-blown" process differs from the "blown-blown" process only in the phase of shaping a blank or rough mold. In the "press-blown" process, a blank is obtained by compression of the glass in the closed roughing mold by means of a more or less lengthy punch that penetrates into the mold in the bottom of the latter through the collar mold. There are therefore no compression or perforation stage, and the opening of the product is formed in a single operation by this pressing.

These processes allow one to make products with shapes that are axisymmetrical or not. The device, which is used here as indicated above, comprises only one section of an individual section machine, which has several of them.

SUMMARY OF THE INVENTION

However, more and more complex shapes of products have been envisaged for applications of packaging in the perfume and cosmetic industries, in particular. According to the present invention, a collar would no longer have to be positioned at the end of a flask, jar, etc., but may be position on a side of their bodies.

The first purpose of the invention therefore consists of a glass product that includes a body and a collar; this product is distinguished by the fact that the axis of at least one part of the body and the axis of the collar are not parallel.

Advantageously, the aforementioned part of the body represents a substantial proportion of the quantity of glass constituting the product, that is, at least 20%, and preferably at least 60%.

According to the present invention, the axis of the at least one part of the body and the axis of the collar in the glass product form an angle equal to at least 60° but less than 180°, preferably between 90 and 150°.

As mentioned previously, a product according to the present invention includes a bottle, a flask or a jar in a preferred manner.

In order to fabricate this product, a collar mold is initially held in its traditional position in roughing and finishing molds, that is, in the vertical position of the axis of the collar mold at the lower end of the cavity of the roughing mold and at the upper end of the cavity of the finishing mold, respectively. Such an arrangement is difficult to achieve industrially, since it essentially requires, for many forms of implementation of the product of the invention, that a ball of molten material be introduced into the cavity of the roughing mold through a non-vertical entrance section of the roughing mold. This characteristic is prejudicial to the distribution of the molten material in a compact and homogeneous mass at the bottom of the cavity of the roughing mold and especially near the collar mold. In fact, the contact of the molten material with the walls of the cavity is increased, and therefore, the cooling of the material by the mold also increases. The increased viscosity of the material that thereby results is harmful to the progression of the material toward the bottom of the cavity. In order to overcome such a problem, the inventors have offset the axis of the collar mold in the roughing mold and in the finishing mold with respect to their vertical axes.

Thus, a second object of the invention is to provide a fabrication process of a glass product as described previously, which includes the stages of:

introducing a ball of molten material into the cavity of a roughing mold of which at least one input section for receiving the ball is approximately vertical;

allowing the ball of molten material to thoroughly penetrate into the bottom of the roughing mold, the bottom of the roughing mold including a part which corresponds to the collar of the final product;

perforating a collar by movement of a punch along a non-vertical axis;

possibly carrying out blowing through the collar following the extraction of the punch for the purpose of definitive shaping of the blank;

transferring the blank into a finishing mold by turning over the blank 180° with respect to a horizontal axis; and performing blowing through the collar in order to give the product its final shape.

The allowing process described above may be assisted by blowing, for example, compressed air.

In conformity with the preferred characteristics of the process, the input section of the molten ball represents at least 20%, in a particularly preferred way, at least 60% of the total volume of this cavity, and the axis of translation of the punch forms an angle equal to at least 60° but less than 180°, preferably between 90 and 150° with respect to the vertical.

A third object of the present invention is to provide an individual section machine which can be used for the fabrication of a product as described above. Such an individual section machine includes a collar mold, a roughing mold in which at least one substantial upper part of the cavity is approximately vertical, and a finishing mold, wherein the collar mold is configured to be alternately positioned in the roughing and finishing molds such that the axis of the collar mold forms an angle equal to at least 60° but less than 180° with respect to the vertical.

An object of the present invention is to provide a novel process for manufacturing a hollow glass object having the collar with an offset axis.

Another object of the present invention is to provide a hollow glass object having the collar with an offset axis.

Another object of the present invention is to provide an device for implementing the novel manufacturing process described above.

The first object may be accomplished by a process of manufacturing a hollow glass product with an offset collar axis, including the steps of inserting molten material into a cavity of a roughing mold, allowing the molten material to penetrate into a bottom portion of the roughing mold, perforating a collar by moving a punch into the bottom portion of the roughing mold along a non-vertical axis, extracting the punch from the bottom portion of the roughing mold, thereby completing processes of shaping the molten material into a blank, transferring the blank into a finishing mold by turning over the blank 180° with respect to a horizontal axis, and blowing the blank through the collar in the finishing mold such that the blank shapes into a hollow glass product. The cavity includes at least one input section which is substantially vertical.

The second object may be accomplished by a glass product including a body having at least one part, and a collar formed on the body, wherein an axis of said collar is not parallel to an axis of said at least one part.

The third object may be accomplished by an individual section machine for manufacturing a hollow glass product with an offset collar axis, including a roughing mold having a cavity with at least one upper part, a finishing mold, and a collar mold including a punch configured to form a collar of the hollow glass product and configured to position the punch alternately in the roughing mold and finishing mold such that an axis of the punch form an angle between 60° and 180° with respect to a vertical axis. The at least one upper part is substantially vertical.

BRIEF DESCRIPTION OF THE DRAWINGS

A more complete appreciation of the invention and many of the attendant advantages thereof will become readily apparent with reference to the following detailed description, particularly when considered in conjunction with the accompanying drawings, in which.

DETAILED DESCRIPTION OF THE PREFERRED EMBODIMENTS

Figure 1:
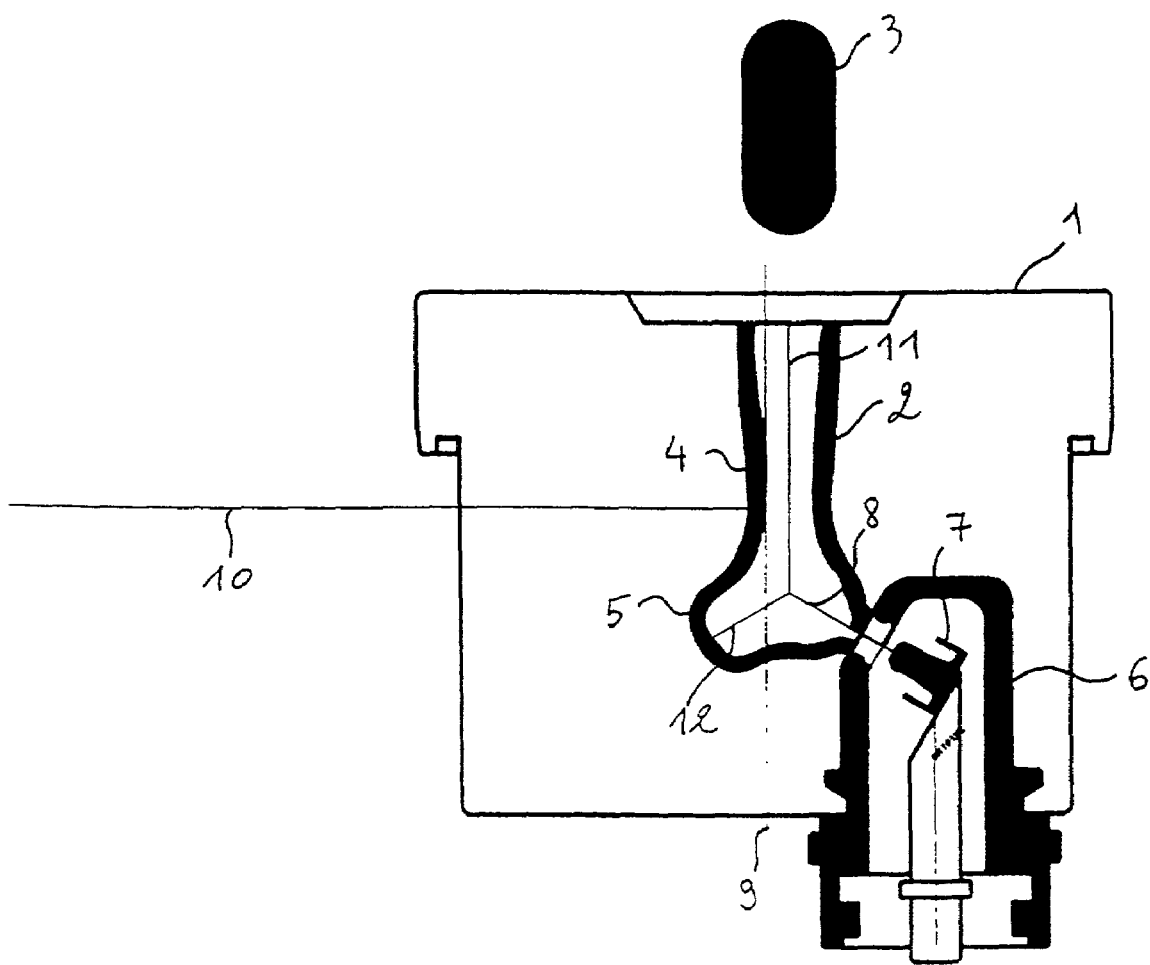
FIG. 1 is a schematic view showing the first stage of the successive stages in the fabrication process of a product according to an embodiment of the present invention.

The preferred embodiments will now be described with reference to the accompanying drawings, wherein like reference numerals designate corresponding or identical elements throughout the various drawings.

With reference to FIG. 1, a roughing mold 1, which is a part of an individual section machine, receives in its cavity 2 a molten ball of glass 3. A first part 4 of the cavity 2 by which the molten ball 3 enters is approximately vertical. In addition to the first part 4, the cavity 2 is also shaped by a second part 5, which comes after the first part 4, shorter than the latter and with which it forms an angle of 120°. The roughing mold 1 includes a housing for receiving a collar mold 6. The collar mold 6 includes a punch 7 and the axis of the punch 7, which is represented by the reference numeral 8. Th axis 8 of the punch 7, which is traditionally vertical, is also inclined in conformity with the present invention by 120° with respect to the first part 4.

Also shown is machine axis 9 located in the central plane of the roughing mold 1, an axis 10 representing one of the components of the subsequent turning motion described below, which causes the intermediate glass product to pass from the roughing mold 1 to a finishing mold as well as the axes 11, 12 of the first and second parts 4, 5, respectively, of the cavity 2.

Figure 2:
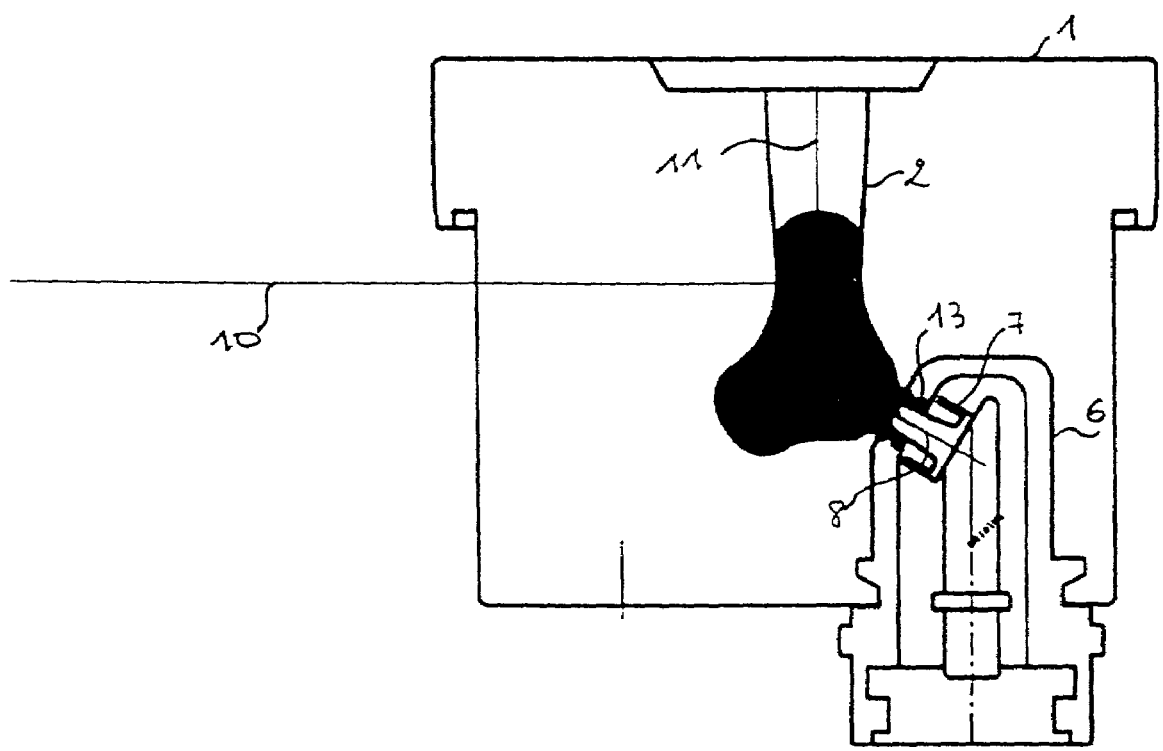
FIG. 2 is a schematic view showing the second stage of the successive stages in the fabrication process described above.
Figure 3:
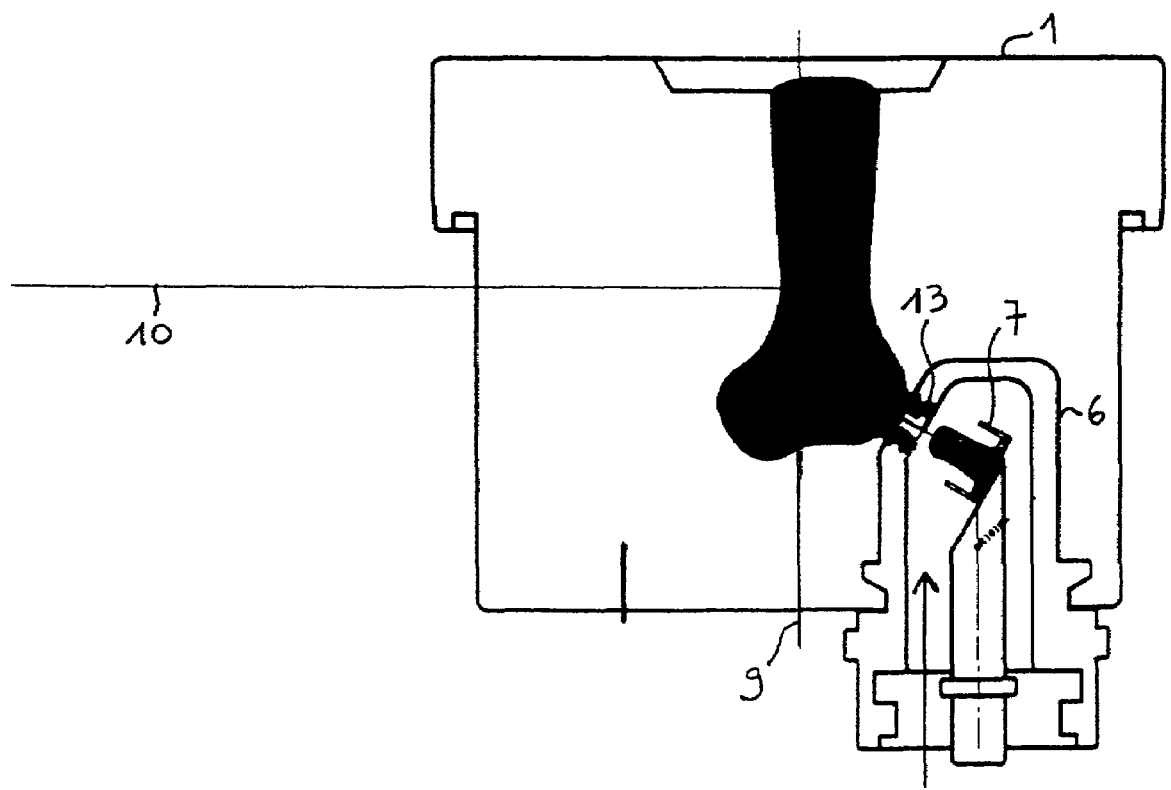
FIG. 3 is a schematic view showing the third stage of the successive stages in the fabrication process described above.

As illustrated by FIG. 2, the glass fills a lower part of the cavity 2 and a collar 13 of a flask is shaped by driving-in of the punch 7. Following retraction of the punch 7, a blank is formed by injection of compressed air as indicated by the arrow in FIG. 3, that is, in the body of the blank through collar mold 6.

Figure 4:
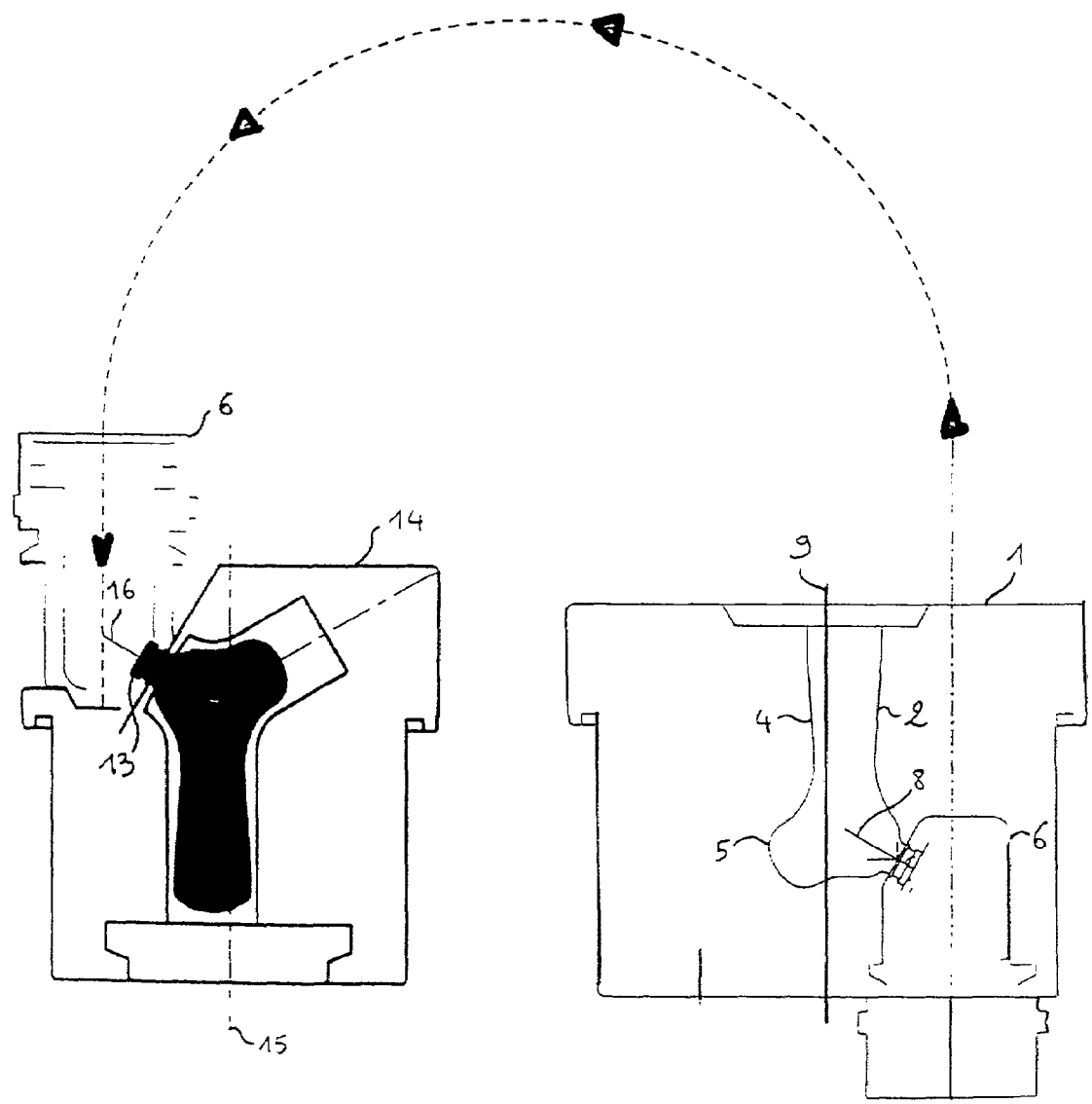
FIG. 4 is a schematic view showing the fourth stage of the successive stages in the fabrication process described above.

The blank is then transferred to a finishing mold 14 of the individual section machine by a turning-over movement, while the collar mold 6 is being used as a gripping element of the blank as shown in FIG. 4. Also shown in FIG. 4 is a machine axis 15 of the finishing mold 14, which also corresponds to the median plane of the finishing mold 14, and the axis 16 of the collar mold 6 fixed in the finishing mold 14. A cavity of the finishing mold 14 is constructed in such a manner as to maintain the angle relationships existed between the axes 8, 11, 12 in the roughing mold 1.

Figure 5:
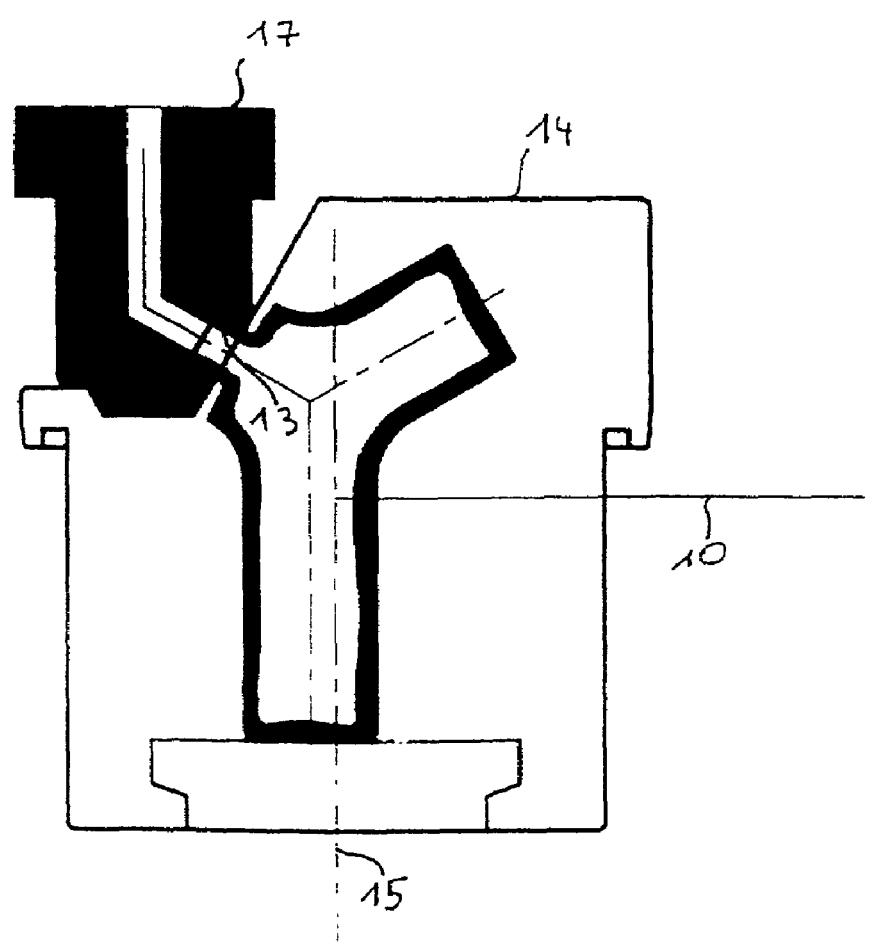
FIG. 5 is a schematic view showing the fifth stage of the successive stages in the fabrication process described above.

The following stage shown in FIG. 5 includes a blasting unit head 17 replacing the collar mold 6 in the finishing mold 14. The blasting unit head 17 supplies compressed air into the interior of the blank through the collar 13, thereby shaping the blank into the flask. The axis of the blasting head 17 is offset by 120° with respect to the vertical in the same manner as the axis 16 of the collar mold 6.

Figure 6:
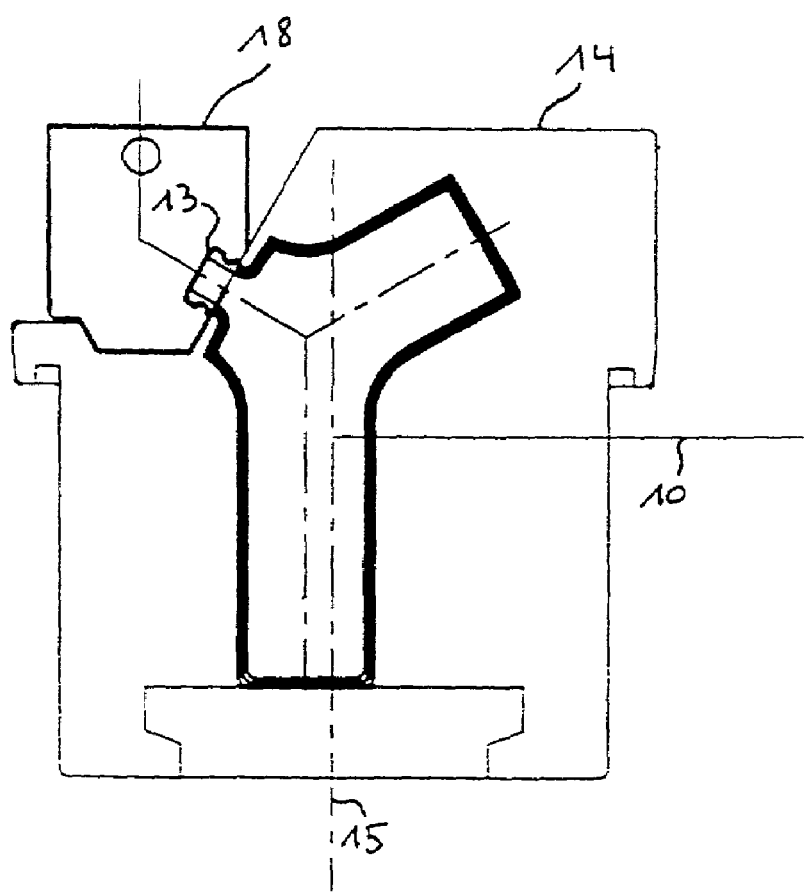
FIG. 6 is a schematic view showing the sixth stage of the successive stages in the fabrication process described above.
Figure 8:
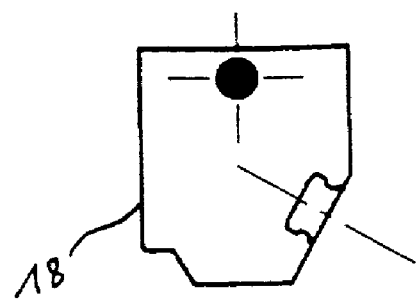
FIG. 8 is a schematic view showing the final stage of the successive stages in the fabrication process described above.

The process then includes, for example, the following operations:

gripping the flask by means of tongs 18 after opening the finishing mold 14 as shown in FIG. 6;

repositioning the tongs 18 with offset distance of 120° with respect to the vertical in order to turn to take the next flask as shown in FIG. 8.

Figure 7:
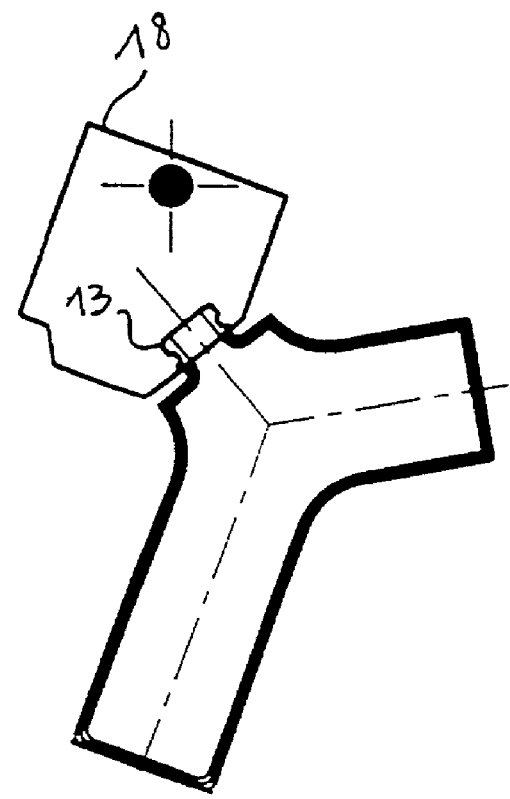
FIG. 7 is a schematic view showing the seventh stage of the successive stages in the fabrication process described above.

In the gripping operation, the tongs 18 is advantageously articulated in order to be oriented depending upon the center of gravity of the assembly unit, thereby preventing deformation of the collar 13 that is still fragile as shown in FIG. 7

Thus, the present invention provides a hollow product made of thermoplastic material, especially of glass with a complex shape, in which the collar axis is offset with respect to the axis of at least one part of the body of the product as well as a fabrication process of such a product. The quality of a product achieved according to the present invention is excellent, in particular, due to the fact that homogeneous distribution of the thermoplastic material in the molds, especially in the vicinity of the collar, limited contact of the molten ball with the walls of the roughing mold, thereby decreasing thermal transfer and optimizing viscosity and flow of the material and satisfactorily filling of the bottom of the cavity in the roughing mold are achieved.

Obviously, numerous modifications and variations of the present invention are possible in light of the above teachings. It is therefore to be understood that, within the scope of the appended claims, the invention may be practiced otherwise than as specifically described herein.

What is claimed as new and is desired to be secured by Letters Patent OD the United States is:

1. A glass product comprising:
   a main container body having a closed bottom;
   a secondary container body; and
   a collar opened to an exterior of the product interposed between and communicating with said main container body and the secondary container body, said collar having an axis not parallel to an axis of said main container body and an axis of said secondary container body, the collar being integral with the main and secondary container bodies, and the collar extending beyond a cross section of the main body.

2. The glass product of claim 1, wherein said main container body comprises at least 20% of glass in the glass product.

3. The glass product of claim 1, wherein said main container body comprises at least 60% of glass in the glass product.

4. The glass product of claim 1, wherein said axis of said main container body and said axis of said collar form an angle between 60° and 180°.

5. The glass product of claim 4, wherein said axis of said main container body and said axis of said collar form an angle between 90° and 150°.

6. The glass product of claim 1, wherein the secondary container body is configured to extend above the collar and the main container body.

7. The glass product of claim 6, wherein the axis of the collar is configured to extend in a direction between horizontal and vertical.

8. The glass product of claim 1, wherein the axis of the collar is configured to extend at an angle between horizontal and vertical.

9. The glass product of claim 8, wherein the axis of the collar is configured to extend at an angle of about 120° from a bottom surface of the main container body on which the glass product is configured to be disposed.

10. The glass product according to claim 9, wherein the axis of the secondary container body is configured to extend at an angle of about 120° from the axis of the collar, such that the glass product has an about Y-shape.

11. The glass product according to claim 10, wherein at least one of the main and secondary container bodies, and the collar, has an about cylindrical shape.

12. The glass product according to claim 11, wherein each of the main and secondary container bodies, and the collar, have an about cylindrical shape.

13. The glass product according to claim 1, wherein the product is a blown-blown glass product or a press-blown glass product.

14. The glass product according to claim 1, wherein the glass product has a single opening.

15. A glass product, comprising:
    a main container body having a closed bottom;
    a secondary container body; and
    a collar opened to an exterior of the product interposed between and communicating with said main container body and the secondary container body, wherein the collar is intergral with the main and secondary container bodies, the main container body is configured to extend along axis of the main container body in an about vertical direction, the collar is configured to extend along an axis of the collar at a first angle relative to the axis of the main container body, and the secondary container body is configured to extend along an axis of the secondary container body at a second angle relative to the axis of the collar, when a bottom surface of the main container body contacts a surface on which the glass product is to be disposed.

16. The glass product of claim 15, wherein the first and second angles are about equal.

17. The glass product of claim 15, wherein the main and secondary container bodies extend along their axes distances greater than a distance in which the collar extends along its axis.

18. The glass product of claim 15, wherein the main and secondary container bodies have substantially cylindrical shapes.

19. The glass product of claim 18, wherein the collar comprises a substantially cylindrical shape.

20. The glass product of claim 19, wherein the first and second angles are about 120°.

21. The glass product of claim 20, wherein the main and secondary container bodies, and the collar are disposed in about Y-shape.

22. The glass product according to claim 15, wherein the product is a blown-blown glass product or a press-blown glass product.

23. The glass product according to claim 15, wherein the glass product has a single opening.

* * * * *